J. E. WISNER.

Horse Hay-Rake.

No. 8,805. Reissued July 15, 1879.

Witnesses.

Harry King

Wm. Blackstock

Inventor.

James E. Wisner

By Hill & Ellsworth

His Attys.

N. PETERS, PHOTO-LITHOGRAPHER, WASHINGTON, D. C.

UNITED STATES PATENT OFFICE.

JAMES E. WISNER, OF FRIENDSHIP, NEW YORK.

IMPROVEMENT IN HORSE HAY-RAKES.

Specification forming part of Letters Patent No. 192,318, dated June 19, 1877; Reissue No. 8,805, dated July 15, 1879; application filed November 22, 1877.

*To all whom it may concern:*

Be it known that I, JAMES E. WISNER, of Friendship, in the county of Allegany and State of New York, have invented certain new and useful Improvements in Horse Hay-Rakes; and I do hereby declare the following to be a full, clear, and exact description of the same, reference being had to the accompanying drawings, forming part of this specification.

My invention relates to horse hay-rakes; and consists of three main and some subordinate features, which I proceed particularly to set forth.

The first of the more important points relates to the connection of the frame with the axle, whereby the weight of the axle may be greatly lessened, and the thills and frame-work attached thereto may be more perfectly braced and supported. The second relates to an improved construction of the rake-head in order to bring it near the axle of the machine on which it tilts; and the third relates to the connecting of the axle and rake-head together, so as to cause them to mutually support and brace each other, by a connection extending between them at the side or sides of the lifting-wheel. The other features will be described in order.

In horse hay-rakes as hitherto made the weight of the frame and the driver riding thereon is borne near the center of the axle, which renders it necessary that the axle should be stout and heavy, in order to avoid bending and springing.

The connection between the thill-frame and the axle has also been usually made at some distance from the wheel-hubs, which renders the axle at or outside of the points of connection liable to be strained or bent when either wheel encounters any large obstacle.

To obviate these disadvantages, and at the same time more effectually brace and strengthen the thill-frame itself, I now connect the thill-frame to the axle by means of diagonal lateral braces extending from a point in each shaft or thill between the axle and the whiffletree to a point on the axle in close proximity to the traction-wheel, where they are articulated to the axle, so as to allow of the necessary revolution of the latter when the machine is in operation.

Figure 1:
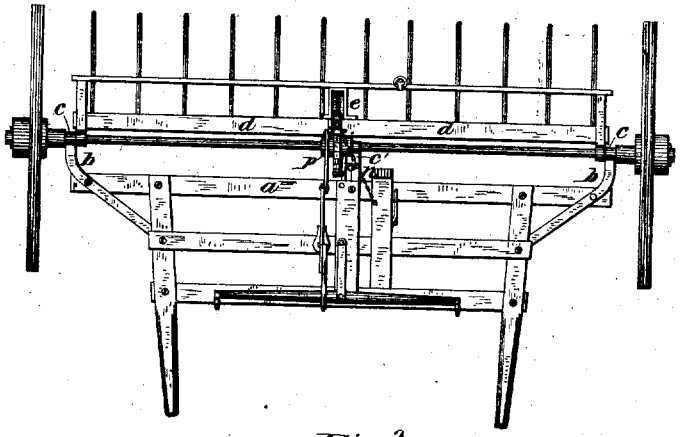

In Figure 1 of the drawings, the main cross-bar of the frame next the axle is represented at *a*. To this the shafts are rigidly fastened, and there are other suitable cross-bars and frame-work of the ordinary construction. This frame, which may obviously be greatly varied without departing from the spirit of my invention, I connect to the axle, in this case, by diagonal lateral braces *b b*, extending from the points *c c*, in close proximity to the hubs of the wheels, to the respective thills at a point in rear of the whiffletree. The form of the connecting-bars may also be varied, the essential element being the arrangement of them diagonally upon the thill-frame, so as to brace and strengthen the several parts thereof, and to bring the connection of said frame with the axle at the proper points in close proximity to the wheels.

For the purpose of distributing the weight of the frame and driver more uniformly throughout the entire length of the axle, I may also make connections near the middle of the axle at *c'* in proximity to the ratchet-wheel or lifting-wheel, by which the rotation of the wheel is made to raise the rake and dump the load. By this construction the draft, like the weight, is uniformly distributed, and not only is the weight of the axle greatly lessened, but the draft is steadier. The principal weight is thrown upon the axle next the hubs, where the strain on the axle is the least possible, and the cross-bar *a* lends its whole strength to the axle itself. This cross-bar may be brought as near the axle as the ratchet-wheel will permit.

In the construction which I have shown the bent bars *b b* are bolted to the ends of the bar *a*, and, bending inward, are secured firmly to the shafts. The central connection, *c'*, lends its support where the strain of the dumping mechanism falls.

Obviously as many intermediate connections between the bar and axle may be made as may be deemed necessary.

The second part of my invention is shown more clearly, in respect to the main element thereof, in Fig. 1. In those machines of this class in which the axle rotates continuously the rake is tilted by means of a ratchet-wheel or some equivalent mechanism arranged on the axle and moving therewith; but it is highly important to bring the rake-head as near as possible to the axle on which the rake tips, in order to lessen the leverage which the head would have on the lifting mechanism, and that the weight with which it would fall when released may be as small as possible. This object I accomplish by cutting the head of the rake in two parts, and separating them far enough to admit the ratchet-wheel in the space between the parts, thus permitting the head to be located nearer to the axle than could otherwise be done. In carrying out this part of the invention there are details of construction which will be fully described.

In Fig. 1 of the drawings, the divided rake-head is marked *d d*. The outer ends are severally held in straps which pass around the axle and extend outward, and afford supports for the ends of the tooth-board. These straps may be greatly varied in form with the same effect. The inner ends of the divided rake-head are held in a metal connection, *e*, which extends under these ends and is bolted thereto, firmly holding them in place, and leaving the space between them clear for the operation of the lifting-wheel, which occupies a portion of said space.

Figure 2:
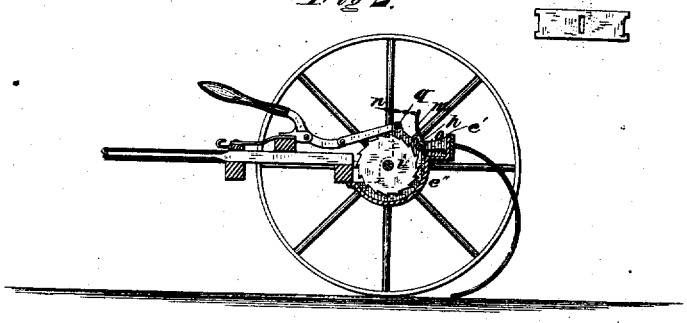

The third part of my invention is shown in Figs. 1 and 2, and consists in two metal plates arranged one at each side of the ratchet or lifting-wheel, so as to inclose the latter between them, each of said plates articulating on the axle as a pivot, and they being also connected to the rake-head and to the tooth-board, which they support at the middle thereof. The plates thus inclose and guard the lifting-wheel, furnish a bearing and support for the axle on each side of the point of strain caused by the operation of the lifting-wheel, brace and support the rake-head on each side of the point of strain to which it is subjected when the wheel is lifting it, and furnish the pivotal connection between the rake-head and axle intermediate between the end straps.

In the mode of construction which I have represented in the drawings, the casting *e* is formed with two side plates, which perform the function of connecting the rake-head and axle, and inclosing the lifting-wheel, as I have described, and a part of this casting (marked *e'*) extends rearward to support the tooth-board. This part is recessed, and in it is located the spring which holds the pawl *h* out of gear. Another part, *e''*, forming a concave rim, connects the two side plates, and covers and protects the lower and rear edge of the wheel from catching into and clogging with the hay. The pawl is pivoted at *o*, and to its arm *m* is attached a chain or cord, *n*, the other end of which is attached to a standard, and which serves to throw the pawl into gear by pressure of the foot thereon. This pawl connects the rake-head to the ratchet, and the rotation of the wheels thereby raises the rake until the arm *m* strikes a stop and releases the pawl from the ratchet, when the rake falls in the usual way.

The construction of the casting and arrangement of the pawl are shown more clearly in Fig. 2 in respect to the rearward extension and the case.

In Fig. 1, at *p p*, are shown those parts through which the axle passes, and which turn thereon, serving as the central supports for the rake-head. A small projection, *g*, Fig. 2, serves for the attachment of the ordinary hand-lifting mechanism. The outer bearings of the rake-head are shown near those of the thill-frame and near the hubs of the wheels.

It will be observed that the axle is supported, both at the ends near the wheels and near the middle at the side of the lifting-ratchet, by the arms projecting on the one side from the frame-bar *a*, and on the other from the rake-head *d*, so that the axle, the rake-head, and the frame-bar are thus caused to mutually support and strengthen each other.

Figure 3:
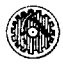

Another feature employed in my machine is shown in Fig. 3. This shows the outer end of the wheel-hub with the pawl connected with the axle. The pawl with its spring is of the ordinary construction; but the teeth into which it catches are plain cogs, alike on both sides. This allows the same casting to be used for both wheels, it being only necessary to reverse the position of the pawl for the opposite end of the axle.

I claim as my invention—

1. In a horse hay-rake, a divided head hinged near the revolving axle, with the lifting mechanism on the revolving axle moving in the space between the parts, as set forth.

2. In a horse hay-rake, the combination of a revolving axle, a divided rake-head connected at both its outer and inner ends to the axle by metallic arms rigidly secured to the head and forming a pivotal connection with the axle, a lifting-wheel attached to the axle opposite to the open space between the two parts of the head, and means for connecting the head at will to the lifting-wheel, and thereby dumping the load by the power of the team, substantially as described.

3. In a horse hay-rake, the combination of a revolving axle with braces *b b*, extending from a point on the shaft between the axle and whiffletree to a point on the axle in close proximity to the wheel, where they are connected to said axle by a hinge-joint, for the purpose of staying the axle and thill-frame work, substantially as shown and described.

4. In a horse hay-rake, the combination of a lifting ratchet-wheel rotating continuously by power applied from both wheels when the rake is advancing, a rotating axle, an oscillating rake-head, and a metal connection extending from the axle to the rake-head on each side of the lifting-wheel, and serving to support the rake-head and axle at the point of greatest strain upon them, and to contain between its sides the pawl which engages with the lifting-wheel to dump the load, substantially as described.

5. In a horse hay-rake, the combination of a rotating axle, an oscillating rake-head, a lifting ratchet-wheel continuously rotating by power applied from both wheels when the rake is advancing, a tooth-board in rear of the rake-head and oscillating with it, and a metal connection extending from the axle to the rake-head on each side of the lifting-wheel, and serving to support the rake-head and axle at the point of greatest strain upon them, and connected also by a rear extension to the tooth-board, for the purpose of supporting and moving the latter, substantially as described.

6. The casting *e*, formed with a rearward extension, *e'*, for supporting the tooth-board, said extension being recessed to receive the spring, substantially as described.

7. The casting *e*, connecting the axle and rake-head, and formed with a shell or casing, *e''*, adapted for the protection of the ratchet from the hay, substantially as described.

8. In combination with the thill-frame, axle, and rake-head of a horse hay-rake, a central draft attachment and support for the axle and rake-head, having bearings through which the axle rotates, and a recess for the lifting-wheel to rotate in to protect it from the hay, substantially as described.

JAMES E. WISNER.

Witnesses:
S. P. MORSE,
C. L. HOWARD.